United States Patent
Panero et al.

(10) Patent No.: US 11,885,262 B1
(45) Date of Patent: Jan. 30, 2024

(54) REPAIRS FOR DEFECTS IN BORES

(71) Applicant: PRATT & WHITNEY CANADA CORP., Longueuil (CA)

(72) Inventors: Samuel Panero, Montréal (CA); Guy Lefebvre, Longueuil (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 0 days.

(21) Appl. No.: 18/167,237

(22) Filed: Feb. 10, 2023

(51) Int. Cl.
| | |
|---|---|
| *F02C 7/00* | (2006.01) |
| *B23P 6/00* | (2006.01) |
| *B23K 26/21* | (2014.01) |
| *B23K 15/00* | (2006.01) |
| *B23K 101/00* | (2006.01) |

(52) U.S. Cl.
CPC ............ *F02C 7/00* (2013.01); *B23K 15/0046* (2013.01); *B23K 26/21* (2015.10); *B23P 6/007* (2013.01); *B23K 2101/001* (2018.08); *F05D 2230/233* (2013.01); *F05D 2230/234* (2013.01); *F05D 2230/80* (2013.01)

(58) Field of Classification Search
CPC ......... F05D 2230/233; F05D 2230/234; F05D 2230/80; B23P 6/007; B23K 15/0046; B23K 26/21; B23K 2101/001; F02C 7/00
See application file for complete search history.

(56) References Cited

U.S. PATENT DOCUMENTS

| | | | |
|---|---|---|---|
| 6,542,843 B1* | 4/2003 | Metzinger | B23P 13/02 702/113 |
| 9,279,684 B2 | 3/2016 | Marty et al. | |
| 9,815,152 B2 | 11/2017 | Foucher et al. | |
| 10,780,502 B2 | 9/2020 | Golly et al. | |
| 11,090,771 B2* | 8/2021 | Henderkott | F01D 5/187 |
| 2006/0231535 A1* | 10/2006 | Fuesting | B23P 6/045 219/121.64 |
| 2010/0077587 A1* | 4/2010 | Peters | F01D 25/243 29/402.01 |
| 2013/0081269 A1 | 4/2013 | Trapp et al. | |

(Continued)

FOREIGN PATENT DOCUMENTS

| | | |
|---|---|---|
| CN | 114406605 B | 4/2022 |
| CN | 115609221 A | 1/2023 |

(Continued)

*Primary Examiner* — Moshe Wilensky
(74) *Attorney, Agent, or Firm* — NORTON ROSE FULBRIGHT CANADA LLP (57) ABSTRACT

A method of repair for a metallic part of an aircraft engine includes detecting a defect inside a bore of the metallic part wherein the defect represents a departure from an intended geometry of the bore, the bore having a diameter and defining a longitudinal axis, and wherein the defect is located within the bore at a depth of at least greater than one diameter along the longitudinal axis. The method also includes measuring a geometry of the defect, preparing a patch with a complementary geometry to fill the geometry of the defect, placing the patch in the bore with the complementary geometry of the patch seated against the geometry of the defect, directing a welding beam from outside the bore, through the bore and onto the patch to weld the patch to the bore, and removing a portion of the patch to provide the intended geometry for the bore.

13 Claims, 8 Drawing Sheets

(56) References Cited

U.S. PATENT DOCUMENTS

| | | | |
|---|---|---|---|
| 2016/0130946 A1* | 5/2016 | Rose | B23K 15/0006 |
| | | | 29/889.1 |
| 2017/0198592 A1* | 7/2017 | Colletti | F01D 5/3007 |
| 2019/0245396 A1* | 8/2019 | Ikemoto | H02K 15/03 |
| 2020/0269364 A1* | 8/2020 | Beers | B23P 6/00 |

FOREIGN PATENT DOCUMENTS

| | | |
|---|---|---|
| CN | 116117298 A | 5/2023 |
| WO | 2011080257 | 7/2011 |

* cited by examiner

REPAIRS FOR DEFECTS IN BORES

TECHNICAL FIELD

The present disclosure relates to repair and manufacture, and more particularly to repair of defects in bores of manufactured articles such as cases for aircraft engines or the like.

BACKGROUND

Manufacturing parts from metal such as large engine components for aircraft engines requires many operations. If any of the operations results in a defect, traditionally the defect must be repaired or the part must be scrapped. Typically, when the defect is in a bore, or another hard to reach location, the part must be scrapped because traditional repair techniques cannot be performed due to limited access for tools inside the bore. This situation can arise, for example, while manufacturing welded assembly cases, bearing housings, struts, or the like, for such aircraft engines.

The conventional techniques have been considered satisfactory for their intended purpose. However, there is an ever present need for improved systems and methods for repairing defects to reduce the need for stripping the engine and/or reduce the frequency of scrapping finished parts having repairable defects. This disclosure provides a solution for this need.

SUMMARY

In one aspect, there is provided a method of repair for a metallic part of an aircraft engine, the method comprising: detecting a defect inside a bore of the metallic part wherein the defect represents a departure from an intended geometry of the bore, the bore having a diameter defining a longitudinal axis, and wherein the defect is located within the bore at a depth of at least greater than one said diameter along the longitudinal axis; measuring a geometry of the defect; preparing a patch with a complementary geometry to fill the geometry of the defect; placing the patch in the bore with the complementary geometry of the patch seated against the geometry of the defect; directing a welding beam from outside the bore, through the bore and onto the patch to weld the patch to the bore; and removing a portion of the patch to provide the intended geometry for the bore.

In another aspect, there is provided a metallic part of an aircraft engine, the metallic part comprising: a bore formed in the metallic part, wherein the bore has a diameter and defines a longitudinal axis extending through the bore; a repaired portion of the bore that is located within in the bore at a depth along the longitudinal axis that is greater than one said diameter of the bore, wherein the repaired section includes: a first crystallization zone with a metallurgical crystal structure indicative of a melted material of a defect patch located at a surface of the bore, wherein the first crystallization zone forms a portion of an inward facing surface of the bore; a second crystallization zone with a metallurgical crystal structure indicative of a heat effected zone, wherein there is a first boundary defined by a melting line joining the first crystallization zone with the second crystallization zone; and a third crystallization zone with a metallurgical crystal structure indicative of native material joins the second crystallization zone at a second boundary, the second boundary including an annealed zone having a finer grain structure than the second crystallization zone.

A method of repair for gas turbine engine parts includes detecting a defect inside a bore of a metallic part where the defect represents a departure from an intended geometry of the bore. The bore has a diameter perpendicular to a longitudinal axis of the bore. The defect is more than one diameter deep within the bore along the longitudinal axis. The method includes measuring a geometry of the defect, preparing a patch with a complementary geometry to fill the geometry of the defect, and placing the patch in the bore with the complementary geometry of the bore seated against the geometry of the defect. The method includes directing a welding beam from outside the bore, through a portion of the bore to the patch to weld the patch in the bore. The method includes removing a portion of the patch to provide the intended geometry for the bore.

Measuring the geometry of the defect can include making a casting of the bore including making a casting of the defect and measuring the defect using measurements of the casting. After measuring the geometry of the defect, the method can include determining the distance between center of the defect and a surrounding portion of the bore to validate that the surrounding portion of the bore will not be affected by the welding beam. Preparing the patch can include machining a washer having a bore therethrough, wherein the washer includes the complementary geometry defined on a radially outward portion of the washer.

Before welding the patch in the bore, the method can include determining welding beam parameters to ensure full penetration of a weld joint to join the patch to the bore, with a minimum heat input. Before welding the patch in the bore, the method can include determining location of the welding beam for welding the patch. Before welding the patch in the bore, the method can included determining a number of passes required for the welding beam to weld the patch in the bore.

After placing the patch in the bore and before directing the welding beam from outside the bore, the method can include tack welding the patch in the bore. The welding beam can be a beam of an electron beam welding process or of a laser welding process.

The bore can be a main bore through a strut and the defect can be in a fastener bore accessible through the main bore. The diameter of the bore can be a chord length of the strut. The defect can be more than one chord length along the longitudinal axes from an external surface from which the main bore extends radially inward. The fastener bore can have a radially outward facing rim and a fastener bore diameter. The defect can be deeper in the fastener bore than one fastener bore diameter from the rim along the longitudinal axis. The strut can be in a bearing casing of a gas turbine engine, or the strut can be in a turbine section of an engine case of a gas turbine engine. The defect can be in a conical surface of the bore.

A gas turbine engine part includes a bore in a metallic part, wherein the bore has a diameter perpendicular to a longitudinal axis of the bore. A repaired portion of the bore is deeper in the bore along the longitudinal axis than one diameter of the bore. The repaired section includes a first crystallization zone with a metallurgical crystal structure indicative of melted material at a surface of the bore, wherein the first crystallization zone forms a portion of an inward facing surface of the bore; a second crystallization zone with a metallurgical crystal structure indicative of a heat effected zone, wherein there is a first boundary joining the first crystallization zone with the second crystallization zone; and a third crystallization zone with a metallurgical crystal structure indicative of native material joins the second crystallization zone at a second boundary. The first crystallization zone can form a conical portion of the inward facing surface of the bore.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

Reference is now made to the accompanying figures in which.

DETAILED DESCRIPTION

Reference will now be made to the drawings wherein like reference numerals identify similar structural features or aspects of the subject disclosure.

Figure 1:
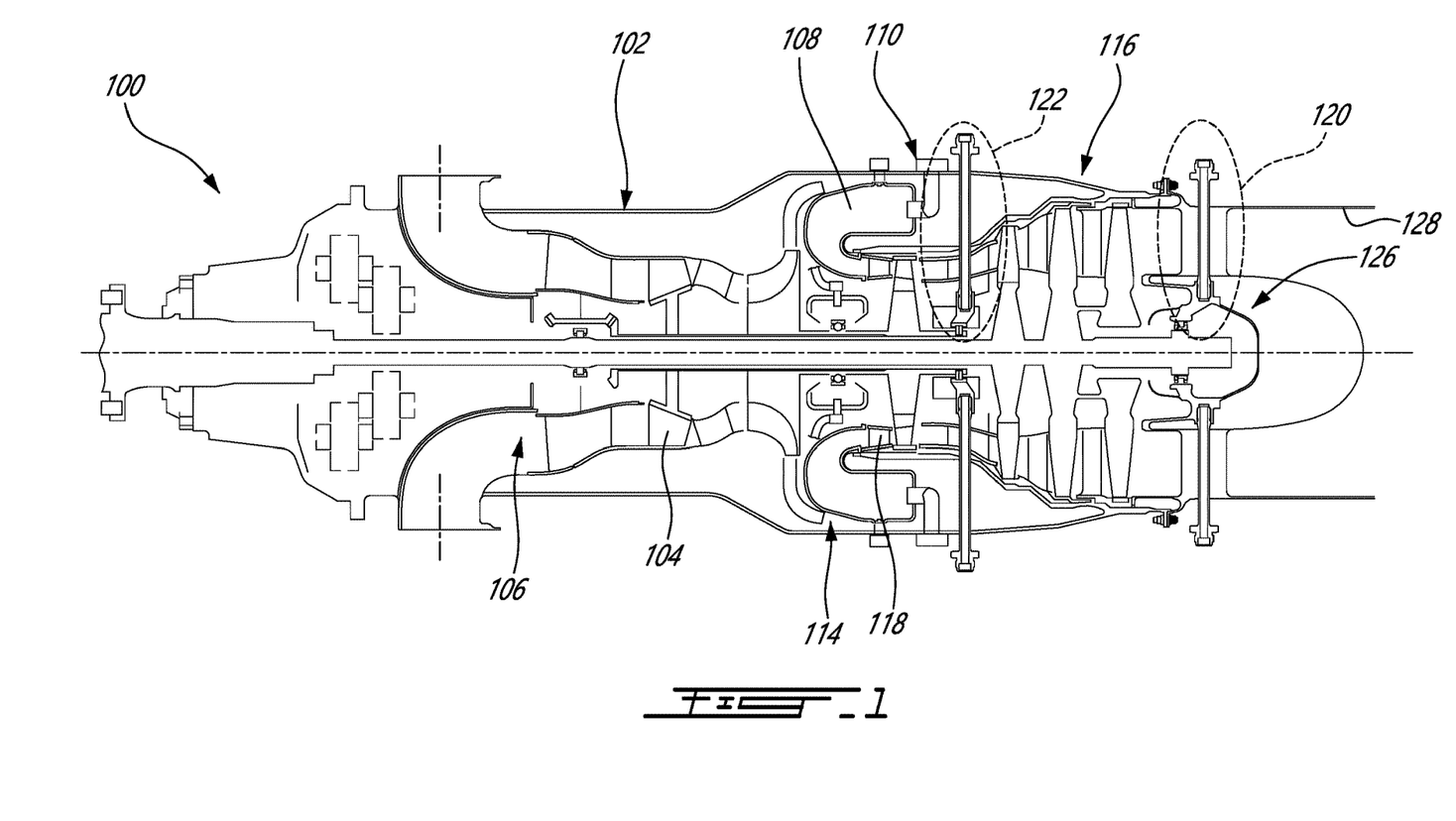
FIG. 1 is a schematic cross-sectional side elevation view of an embodiment of a gas turbine engine constructed in accordance with the present disclosure, showing potential defect locations.

For purposes of explanation and illustration, and not limitation, a partial view of an embodiment of an aircraft engine in accordance with the disclosure is shown in FIG. 1 and is designated generally by reference character 100. FIG. 1 illustrates an aircraft engine 100, in this case a gas turbine engine, of a type preferably provided for use in subsonic flight, generally comprising in serial flow communication a compressor section for pressurizing the air, a combustor in which the compressed air is mixed with fuel and ignited for generating an annular stream of hot combustion gases, and a turbine section for extracting energy from the combustion gases.

As shown in FIG. 1, the engine 100 includes a compressor section 102 having a compressor 104 in a primary gas path 106 to supply compressed air to a combustor 108 of the aircraft engine 100. The primary gas path 106 includes a nozzle manifold 110 for issuing fluid to the combustor 108. The primary gas path 106 includes, in fluid communication in a series: the compressor 104, the combustor 108 fluidly connected to an outlet 114 of the compressor 104, and a turbine section 116 fluidly connected to an outlet 118 of the combustor 108. The turbine section 116 is mechanically connected to the compressor 104 to drive the compressor 104.

The systems and methods described herein can be used to repair defects in hard-to-reach locations within an aircraft engine 100, to reduce instances where a partially finished or finished part must be scrapped due to the presence of a defect detected therein. Embodiments of systems and methods in accordance with the disclosure, or aspects thereof, are provided in FIGS. 2A-9, as will be described.

Figure 2A:
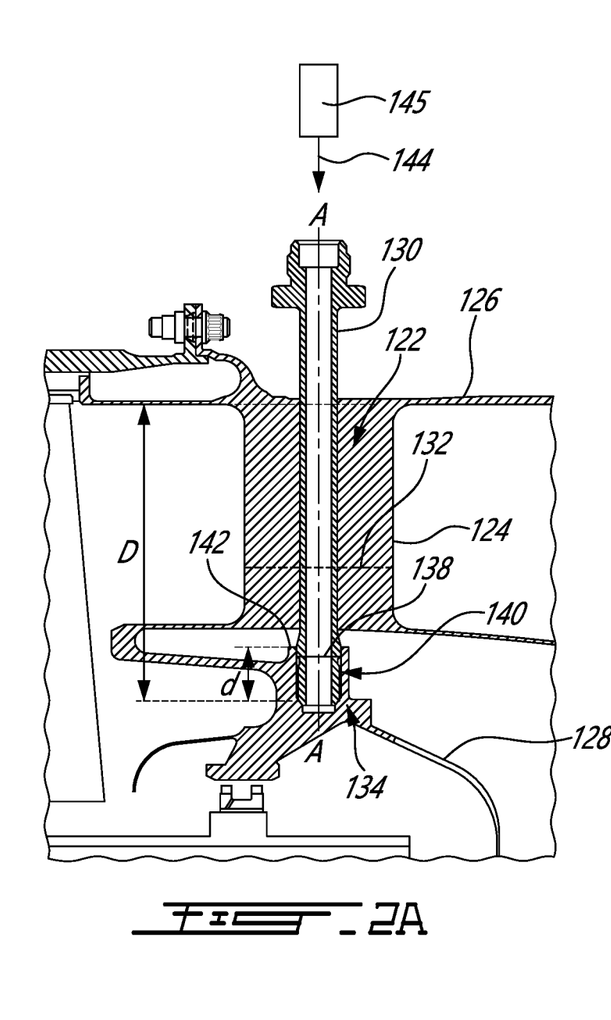
FIG. 2A is a schematic cross-sectional side elevation view of a bore in the engine of FIG. 1, showing a location of a potential defect in a bore.
Figure 2B:
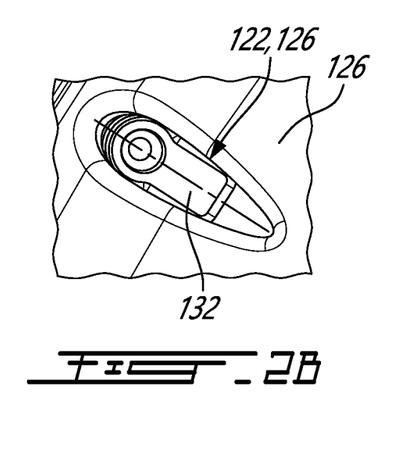
FIG. 2B is a perspective view of the bore of FIG. 2A looking down the longitudinal axis to show the cross-sectional shape of the bore.

A method of repair for aircraft engine parts as disclosed herein includes detecting a defect inside a bore of a metallic part, or another hard to reach location, where the defect represents a departure from an intended geometry of the bore. While the method disclosed herein can be used to repair defects in any suitable bore in any suitable metallic part, FIG. 1 shows two examples of zones 120 and 122 where the method of repair disclosed herein can be applied. FIG. 1 shows two examples where the repair can be applied. Zones 120 and 122, which include bores, show two locations of the engine 100 comprising complex welded parts. As seen in FIGS. 2A and 2B, for example, these zones 120 and 122 may include a fastener bore 140 that extends deep into the part, with limited access using typical cutting tooling. The fastener bore 140 is located in the casing 126 within the turbine section 116 of the engine 100. Access to the fastener bore 140 is possible via a hollow strut 124, which forms a structural connection with the casing 126 and a structural support to the inner bearing housing 128 where the casing 126 is secured in the turbine section 116 by a flange.

With reference now to FIGS. 2A and 2B, the hollow strut 124 has a chord length 132 as shown in FIG. 2B, and an opening used for inserting a coupling part 130, shown here as a service tube that extends through the hollow strut 124 along a longitudinal axis A defined by the fastener bore 140. The exterior surface of the hollow strut 124 has an aerodynamic profile to optimize the engine core flow. The hollow strut 124 is designed to minimize engine losses and power losses. The hollow strut 12 is therefore designed with a clearance envelope slightly larger than the diameter of the fastener bore 140, with an extended chord length 132 which shown in FIG. 2B.

Figure 3:
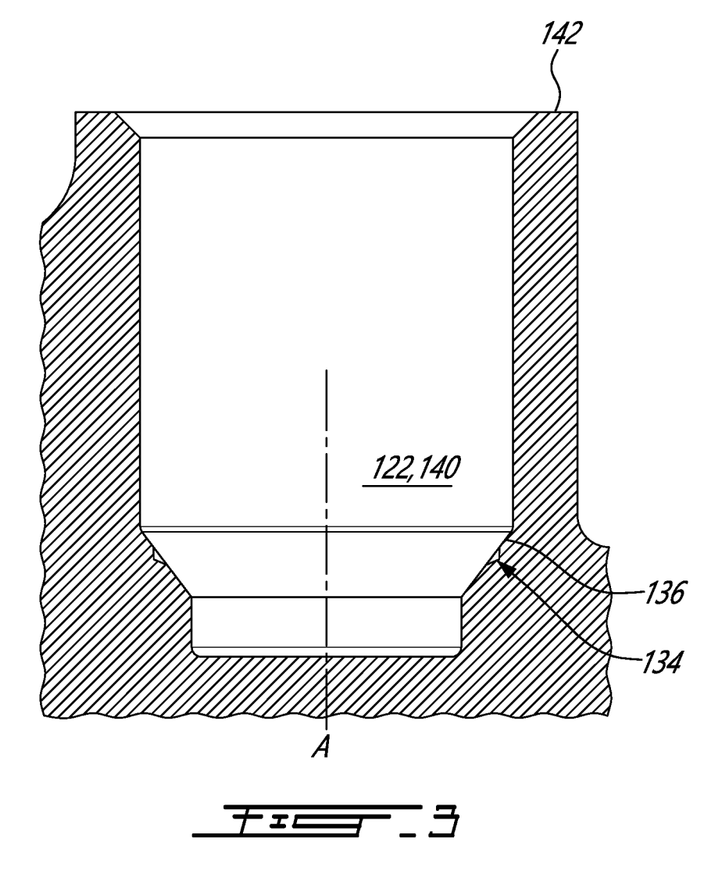
FIG. 3 is a schematic cross-sectional side elevation view of the bore of FIGS. 2A and 2B, showing the defect.

With reference now to FIG. 3, a defect 134 is depicted in the conical surface 136 located near a base of the bore 140. The defect 134 is located within the engine case 126, at a depth D measured radially inward relative to the engine case 126. The depth D of the defect 134 is defined radially inwardly from the outer surface of the engine case 126, but it is understood that depth D may vary according to the design of the engine case 126 as shown in 120 and 122. Depth D is measured from the outer surface of the engine case 126, along the longitudinal axis A and through the hollow strut 124. The fastener bore 140 has a radially outward facing rim 142 and a fastener bore diameter 138. The defect 134 is located at or near the bottom of the fixing bore 140. The defect is located at a second depth d, measured radially inward from a top edge or rim 142 of the fixing bore 140, along the longitudinal axis A, where the second depth d is longer than the diameter 138 of the fixing bore 140. The defect 134 is therefore located at second depth d within the fixing bore 140 and at depth D from the outer surface of the engine case 126. Depth D is at least one time the second depth d, but may be up to several times the depth d. In the embodiment shown in FIG. 2A, depth D is about 7 times greater than the second depth d.

Figure 4:
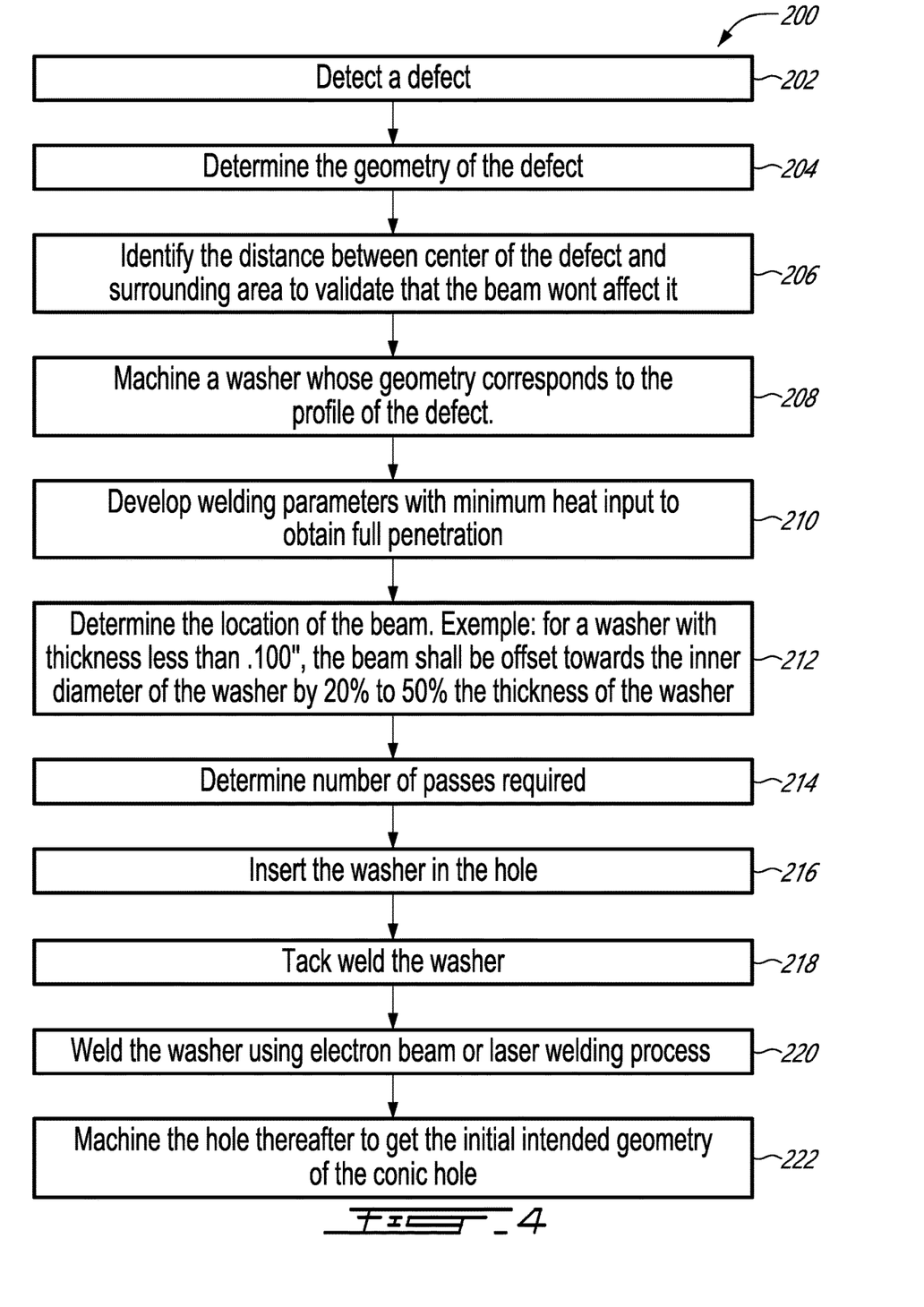
FIG. 4 is a flow diagram of a method of repairing the bore of FIG. 1.
Figure 5:
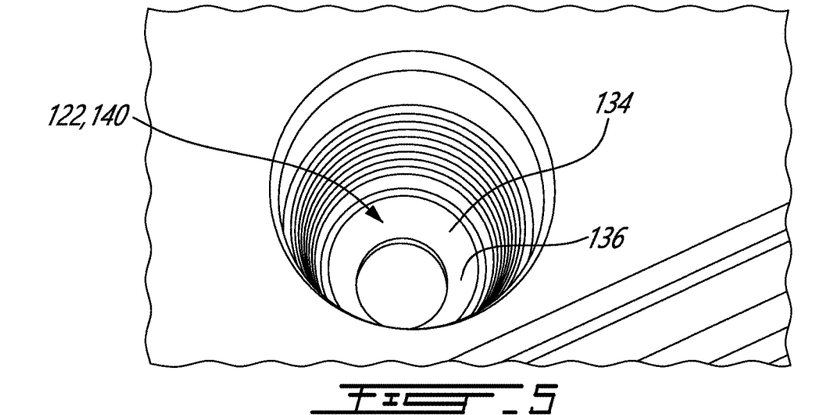
FIG. 5 is a perspective view of the bore of FIG. 3, showing the defect in the conical surface.
Figure 6:
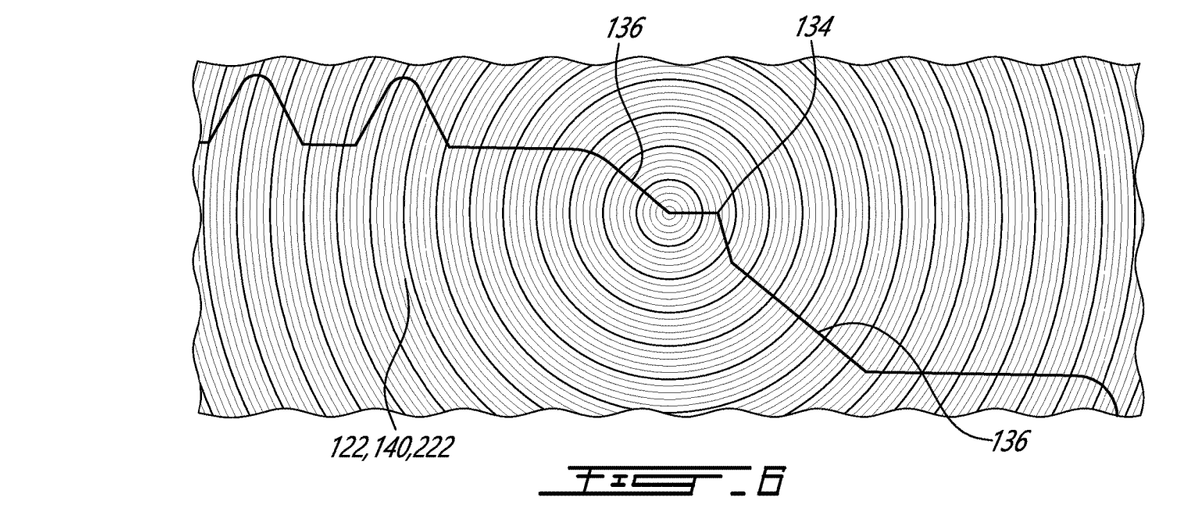
FIG. 6 is a schematic cross-sectional view of the defect of FIG. 5, showing how the geometry of the defect can be measured.

With reference now to FIG. 4, the repair method 200 includes detecting the defect 134, which is shown in FIG. 3, as indicated by box 202 in FIG. 4. Once the defect 134 is detected, the method includes determining, e.g., by measuring, the geometry of the defect 134 (labeled in FIG. 3), as indicated in FIG. 4 by box 204. In a particular embodiment, determining the geometry of the defect 134 (labeled in FIG. 3) can include making a casting of the bore 122 (Labeled in FIGS. 2A and 2B), which includes making a casting of the defect 134 and measuring the defect 134 using measurements of the casting. For example as shown in FIG. 5, a casting material can be introduced into the fastener bore 140 of the bore 122 to form a casting 240, shown in FIG. 6, that is a three-dimensional impression of the fastener bore 140 which includes an impression of the defect 134. Then as shown in FIG. 6, the casting 240 can be measured to determine the full geometry of the defect 134. Any other suitable means for determining the geometry of the defect 134 can be used instead of making a casting, for instance a suitably high resolution three-dimensional scan or other suitable imaging process can be used to determine the geometry of the defect 134. Regardless of the means used for determining the geometry of the defect 134, the subsequently formed patch, as will be described, is selected to have a geometry matching, or more particularly complimentary to, the geometry of the defect such that the patch will fill the defect.

Figure 7:
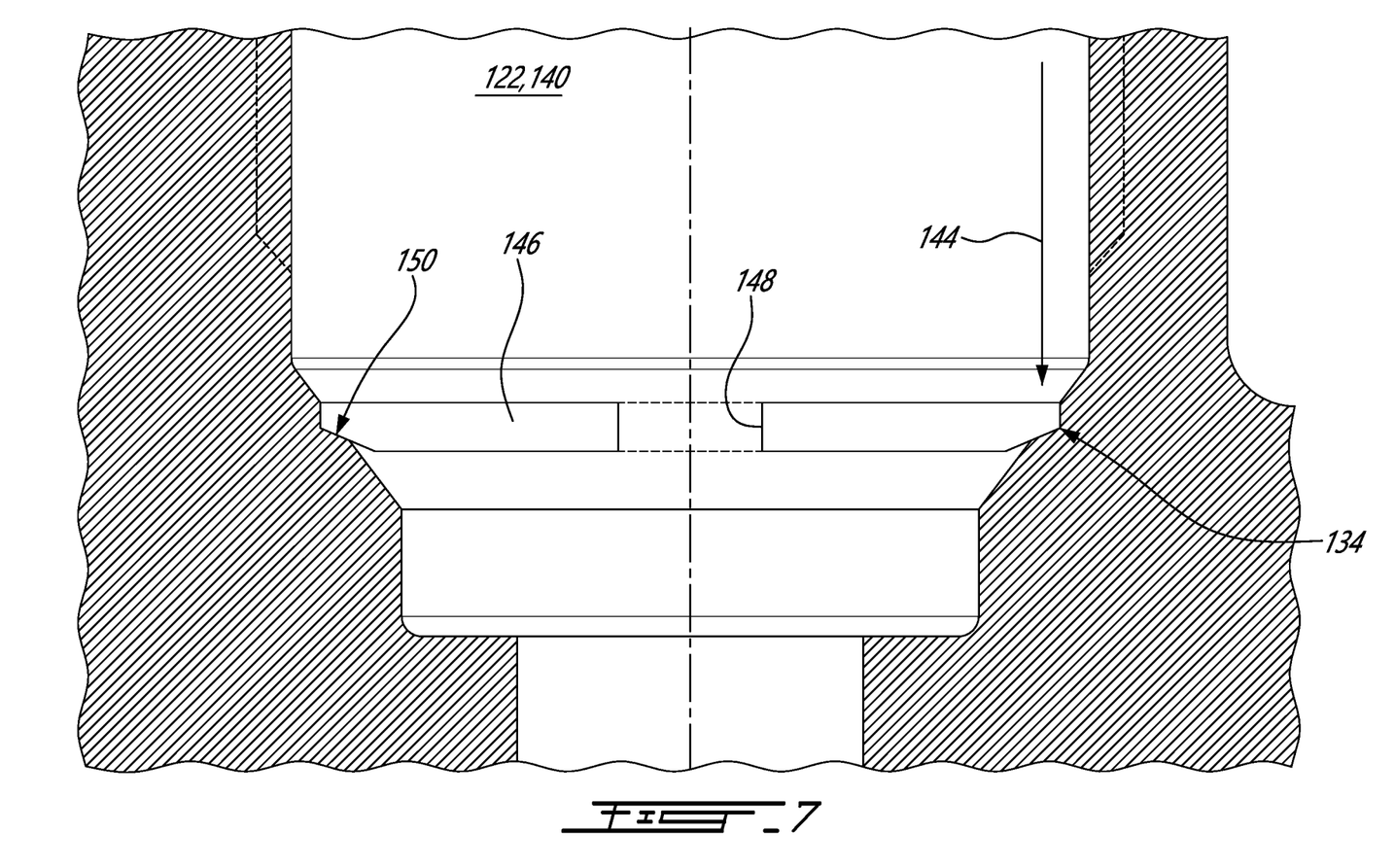
FIG. 7 is a schematic cross-sectional view of the bore of FIG. 3, showing a patch in the form of a machined washer seated in the defect.

With reference again to FIG. 4 and as indicated in box 206, after measuring the geometry of the defect, the method 200 includes determining the distance between center of the defect 134 (labeled in FIG. 3) and a surrounding portion of the bore 122 (labeled in FIG. 3) to validate that the surrounding portion of the bore 122 will not be affected by the welding beam 144 (labeled in FIG. 7).

With continued referenced to FIG. 4, and as indicated in box 208, the method includes preparing a patch 146 (labeled in FIG. 7) with a complementary geometry to fill the geometry of the defect, e.g. using the geometry determined in box 204, and placing the patch 146 in the bore 122 (as shown in FIG. 7) with the complementary geometry of the patch 146 seated against the geometry of the defect 134. In a particular embodiment, preparing the patch 146 of FIG. 7 includes machining the patch 146 from a washer having a bore 148 therethrough, wherein the washer is machined to include the complementary geometry defined on a radially outward portion 150 of the washer, such that the radially outward portion 150 of the washer will have a geometry that precisely corresponds to, and fits within, the defect 134.

Referring again to FIG. 4 and as indicated in box 210, before welding the patch 146 in the bore 122 as shown in FIG. 7, the method 200 includes determining welding beam parameters to ensure full penetration of a weld joint to join the patch 146 to the bore 122, with a minimum heat input. As indicated in box 212, the method also includes determining the location of the welding beam 144 for welding the patch 146 into the bore 122 as shown in FIG. 7. As a non-limiting example, for a washer with a thickness less than 0.100 inches, the beam 144 can be offset towards the inner diameter of the washer by 20% to 50% of the thickness of the washer. Before welding the patch 146 in the bore 122 as shown in FIG. 7, and as indicated in box 214 of FIG. 4, the method 200 includes determining the number of passes required for the welding beam 144 to weld the patch 146 in the bore 122.

As indicated in FIG. 4 with box 216 and as shown in FIG. 7, the method includes placing the patch 146 in the bore 122 with the complementary geometry of the patch 146 seated against the defect 134 of the bore 122. As indicated in FIG. 4 with box 218, after placing the patch 146 in the bore 122 and before using the welding beam 144 to weld the patch 146 to the bore 122, the method 200 includes tack welding the patch 146 in the bore 122, e.g. to hold the patch 146 in place for when the welding beam 144 is applied as shown in FIG. 7.

The welding beam 144 can a beam of an electron beam welding process or of a laser welding process. As indicated by box 220 in FIG. 4, the method 200 includes directing the welding beam 144 from outside the bore 122, e.g. from the beam source 145 depicted in FIG. 2A, through a portion of the bore, e.g. through the depth of the bore D labeled in FIG. 2A, to the patch 146 to weld the patch 146 in the bore 122.

Figure 8:
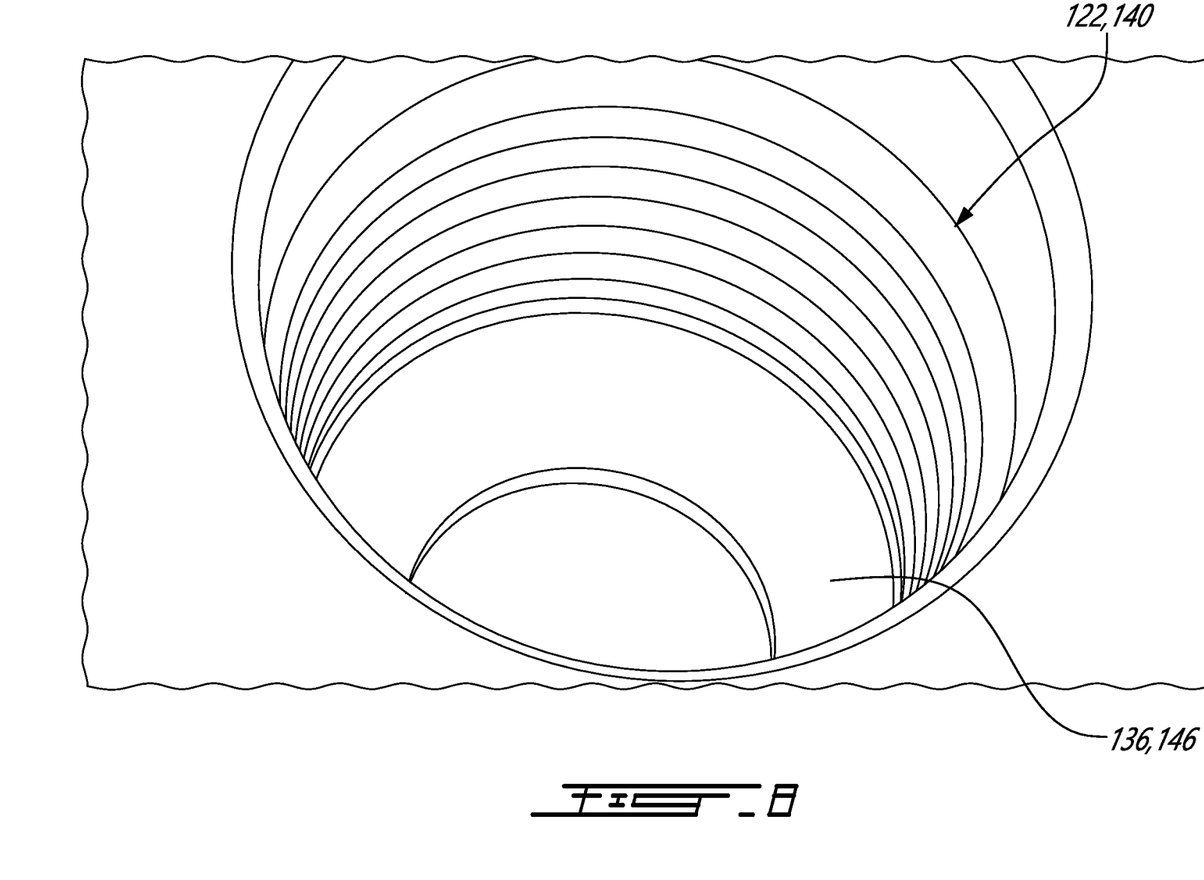
FIG. 8 is a perspective view of the bore of FIG. 5, showing the repaired conical surface of the bore after welding the patch of FIG. 7 and machining it to the originally intended geometry.

As indicated by box 222 in FIG. 4, once the patch 146 is welded into the bore 122 as shown in FIG. 7, the method includes removing a portion of the patch 146 to provide the intended geometry for the bore 122. FIG. 8 shows the bore 122 after the defect 134 shown in FIG. 5 has been repaired by machining away the welded patch 146, in this case leaving the intended defect-free conical surface 136 in the bore 122.

Figure 9:
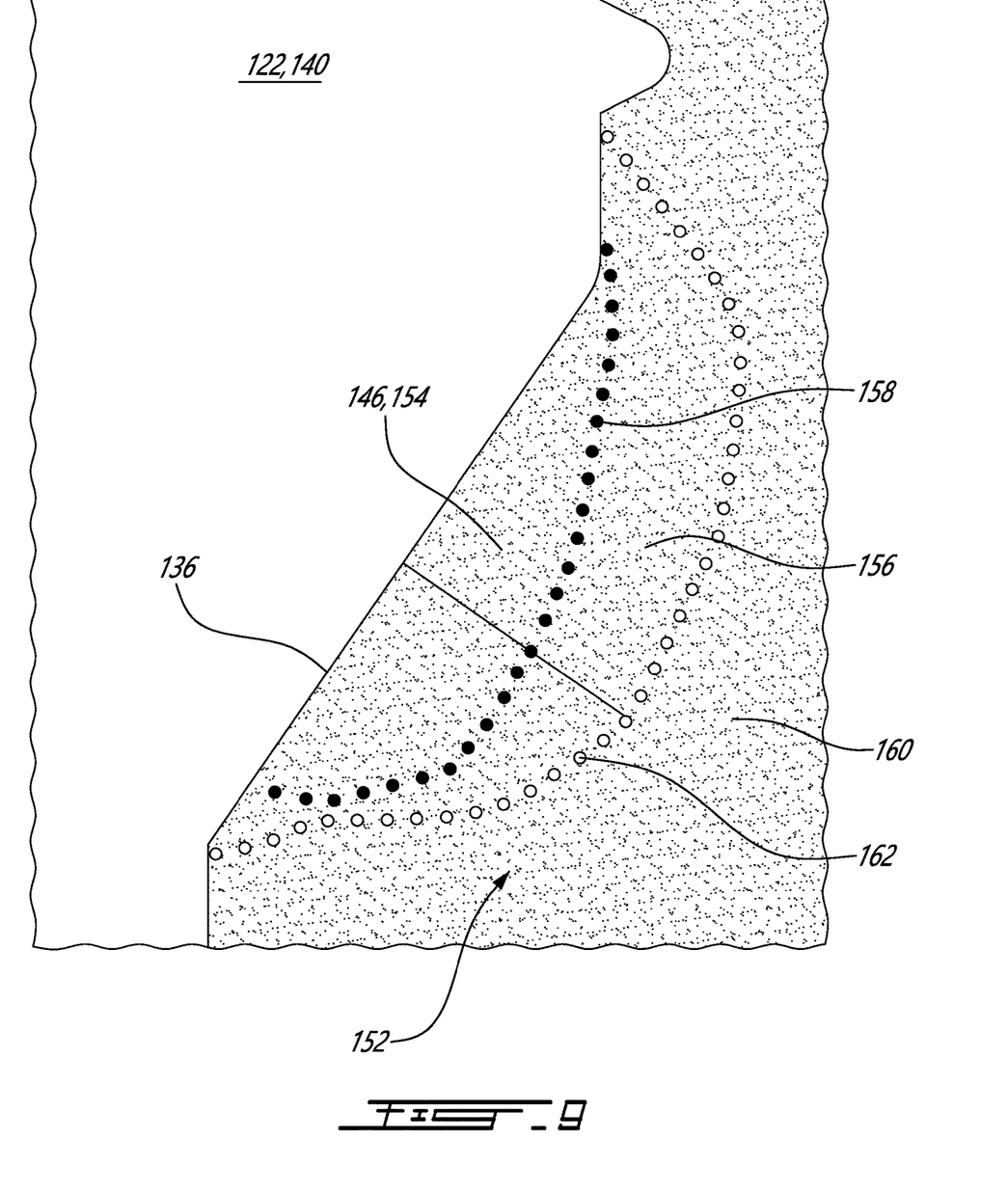
FIG. 9 is a schematic cross-sectional side elevation view of the repaired bore of FIG. 8, showing the melt zone, the heat effected zone, and the native material with their respective boundaries as indicated by the metallurgical crystal structures.

With reference to FIG. 9, the repaired portion 152 of the bore 122 is deeper in the bore 122 along the longitudinal axis A than one diameter of the bore 122, and the repaired portion 152 fills the former defect 134 shown in FIG. 2A. The repaired portion 152 includes a first crystallization zone 154 with a metallurgical crystal structure indicative of melted material at a surface 136 of the bore 122. This corresponds to the weld material, which in this case is the welded washer used to make the patch 146. The first crystallization zone 154 forms a portion of an inward facing surface 136 of the bore 122 that was machined to the intended geometry, e.g. of the conical surface 136 in this case, as described above. The repaired portion 152 includes a second crystallization zone 156, which may also be referred to as an excessive heating zone 156 having a course grain structure, with a metallurgical crystal structure indicative of a heat effected zone from the welding process described above. There is a first boundary 158, or melting line 158 which defines a transition zone, joining the first crystallization zone 154 with the second crystallization zone 156. The repaired portion 152 includes a third crystallization zone 160 with a metallurgical crystal structure indicative of native material, i.e. outside the heat effected zone from the welding. The third crystallization zone 160 joins the second crystallization zone 156 at a second boundary 162. The second boundary 162 includes an annealed zone, having finer grain structure than the second crystallization zone 156, and which is also different from the base metal 160.

Systems and methods of repairing defects in aerospace engine parts, such as a conic hole of a part on a gas turbine engine, are described herein. During manufacturing of a part, there can potentially be a defect all around the conic face of a hole. The engine part itself can be a casting, e.g. where many complex geometries are defined and are within the intended design parameters but for the defect. The defect can be near a region that is already at final dimensions. When the defect can be at a location with a difficult access, conventional TIG welding processes with addition of filler wire cannot be used as there is not enough space or because it will affect the surrounding area negatively. Welding technologies with a welding beam such as electron beam or laser welding can be used to reach the defect, however, there cannot always be sufficient access to add material such as filler wire for beam welding. Traditionally, this situation would result in need to scrap the engine part with the defect. However, systems and methods for repairing defects as disclosed herein, allow for recovery of significant damaged parts and help avoid delays in engine delivery that would costly.

The methods and systems of the present disclosure, as described above and shown in the drawings, provide for repairing defects such as in hard-to-reach locations in gas turbine engine parts and the like, to reduce occasions where the part has to be scrapped. While the apparatus and methods of the subject disclosure have been shown and described with reference to preferred embodiments, those skilled in the art will readily appreciate that changes and/or modifications may be made thereto without departing from the scope of the subject disclosure.

The embodiments described in this document provide non-limiting examples of possible implementations of the present technology. Upon review of the present disclosure, a person of ordinary skill in the art will recognize that changes may be made to the embodiments described herein without departing from the scope of the present technology. For example, although the method is exemplarily described with particular reference to the repair of a defect identified in a bore of an aircraft engine, the repair method as described herein may be used for repairing defects located in other parts or locations within aircraft engines, such as parts which are located at locations which are difficult to reach with typical machinery or repair tools. Additionally, it is to be understood that the method of repairing defects as described herein may also be used for repairing defects in parts that are not in an aircraft engine, but which are similarly difficult to access with traditional machine tools. Such parts may include, for example, metal parts having bores using in other types of engines or machinery. Yet further modifications could be implemented by a person of ordinary skill in the art in view of the present disclosure, which modifications would be within the scope of the present technology.

The invention claimed is:

1. A method of repair for a metallic part of an aircraft engine, the method comprising:
   detecting a defect inside a bore of the metallic part wherein the defect represents a departure from an intended geometry of the bore, the bore having a diameter and defining a longitudinal axis, and wherein the defect is located within the bore at a depth of at least greater than one said diameter along the longitudinal axis;
   measuring a geometry of the defect;
   preparing a patch with a complementary geometry to fill the geometry of the defect;
   placing the patch in the bore with the complementary geometry of the patch seated against the geometry of the defect;
   directing a welding beam from outside the bore, through the bore and onto the patch to weld the patch to the bore; and
   removing a portion of the patch to provide the intended geometry for the bore.

2. The method as recited in claim 1, wherein the measuring of the geometry of the defect includes making a casting of the bore, including making a casting of the defect and measuring the casting to determine the geometry of the defect.

3. The method as recited in claim 1, further comprising after the measuring of the geometry of the defect, determining a distance between center of the defect and a surrounding portion of the bore to validate that the surrounding portion of the bore will not be affected by the welding beam.

4. The method as recited in claim 1, wherein the preparing of the patch includes machining a washer having a bore therethrough, wherein the washer includes the complementary geometry defined on a radially outward portion of the washer.

5. The method as recited in claim 1, further comprising before the welding of the patch in the bore, determining welding beam parameters to ensure full penetration of a weld joint to join the patch to the bore, with a minimum heat input.

6. The method as recited in claim 5, further comprising before the welding of the patch in the bore, determining a location of the welding beam for welding the patch.

7. The method as recited in claim 6, further comprising before the welding of the patch in the bore, determining a number of passes required for the welding beam to weld the patch in the bore.

8. The method as recited in claim 1, further comprising, after placing the patch in the bore and before the directing of the welding beam from outside the bore: tack welding the patch in the bore.

9. The method as recited in claim 1, wherein the directing of the welding beam includes using an electron beam welding process or a laser welding process, the welding beam respectively being an electron beam or a laser beam.

10. The method as recited in claim 1, wherein the bore is a main bore through a strut of the aircraft engine, and the defect is located in a fastener bore accessible through the main bore, wherein the diameter of the bore is a chord length of the strut, and the defect is more than one chord length along the longitudinal axis from an external surface from which the main bore extends radially inward.

11. The method as recited in claim 10, wherein the fastener bore has a radially outward facing rim and a fastener bore diameter, wherein the defect is deeper in the fastener bore than one fastener bore diameter from the rim along the longitudinal axis.

12. The method as recited in claim 10, wherein: the strut is in a bearing casing of the aircraft engine; or the strut is in a turbine section of an engine case of the aircraft engine.

13. The method as recited in claim 1, wherein the defect is located in a conical surface of the bore.

* * * * *